United States Patent

[11] 3,627,934

[72] Inventor John B. Riddle
Los Altos Hills, Calif.
[21] Appl. No. 814,718
[22] Filed Apr. 9, 1969
[45] Patented Dec. 14, 1971
[73] Assignee Micro-Magnetic Industries, Inc.
Palo Alto, Calif.

[54] METHOD AND APPARATUS FOR VERIFYING MAGNETIC RECORDS
3 Claims, 4 Drawing Figs.

[52] U.S. Cl. ....................................................... 179/100.2B, 179/100.2 A, 179/100.2 D, 235/61.11 D, 324/34 TA, 340/149 A
[51] Int. Cl. ....................................................... G11b 5/02, G06k 5/00
[50] Field of Search ........................................... 235/61.11 D; 179/100.2 A, 100.2 B, 100.2 K, 100.2 D, 100.2 R; 340/149 A, 174.1 B; 324/34 TA; 194/4

[56] References Cited

UNITED STATES PATENTS

| | | | |
|---|---|---|---|
| 2,937,368 | 5/1960 | Newby | 179/100.2 |
| 3,274,352 | 9/1966 | Ryno et al. | 340/149 |
| 3,432,747 | 3/1969 | Quittner | 179/100.2 |
| 2,861,133 | 11/1958 | Herr | 179/100.2 |

FOREIGN PATENTS

| | | | |
|---|---|---|---|
| 881,562 | 1/1943 | France | 179/100.2 |
| 1,094,478 | 12/1960 | Germany | 179/100.2 |

*Primary Examiner*—Bernard Konick
*Assistant Examiner*—Jay P. Lucas
*Attorney*—Limbach, Limbach & Sutton

ABSTRACT: A method and apparatus for verifying the validity of magnetic records such as credit cards carrying magnetic information in a layer of magnetically susceptible material by subjecting the records prior to the conclusion of playback to a high-intensity erasing field which has an intensity less than the coercivity of the magnetically susceptible material.

PATENTED DEC 14 1971

3,627,934

INVENTOR.
JOHN B. RIDDLE
BY Limbach & Limbach
ATTORNEYS

METHOD AND APPARATUS FOR VERIFYING MAGNETIC RECORDS

SUMMARY OF INVENTION

Several proposals have been made for providing magnetically recorded information in transitory records carriers such as credit cards, but many of these proposals have involved a security risk to the extent that the transitory record may be altered between the times information is recorded on the record and reproduced from it. Additionally, a substantial risk of record counterfeiting is encountered in such systems where valuable information is recorded on the record member as, for instance, where magnetically coated credit cards are used in place of passbooks for bank savings accounts.

In accordance with this invention, I have provided a method and apparatus for verifying the validity of magnetic record members and the records carried thereon which reduces to a substantial degree the security risks encountered in employing such magnetic records for savings accounts, passbooks and the like. In accordance with this invention, the magnetic record member is made in the form of a substrate coated with a layer of magnetically susceptible material which has a relatively high coercivity, and the validity of the record is tested at the time information is played back from the record by subjecting the record to an erasing field before the conclusion of playback where the erasing field has a field strength greater than 450 oersteds, but less than the coercivity of the magnetic material in the recording member.

The erasing field can be applied separately from the mechanism for reading the magnetic record as by mounting erasing means and magnetic reading means at sequential locations along a magnetic recording member transport. Alternatively, the erasing field can be applied at a point in space coincident with the location where magnetic signals are read from the member. In the latter situation, the magnetic signals may be read by an ordinary tape recorder head, while the erasing field is provided directly in the recording head by an alternating current or direct current bias on the head of sufficient intensity to provide the desired intensity erasing field in the head. When this latter alternative is employed, care must be taken that a magnetic recording head is selected which can carry the erasing field without driving the core of recording head into saturation.

When magnetic recording members are subjected to an erasing field in accordance with this invention, forged recording members are automatically rejected where the magnetic recording member is made from a magnetically susceptible material having a coercivity less than the intensity of the erasing field. For this reason, it is desirable to employ magnetic recording members in accordance with this invention which have coercivities of at least 450 oersteds which is above the coercivity of materials generally used in magnetic recording tapes. A particularly desirable magnetic recording material which may be used for this purpose is chromium dioxide, having a coercivity of at least about 450 oersteds and preferably approximately 600 oersteds.

Other features and advantages of the invention will become apparent from the following description read in conjunction with the attached drawings in which.

Figures 1, 2, 3, 4:
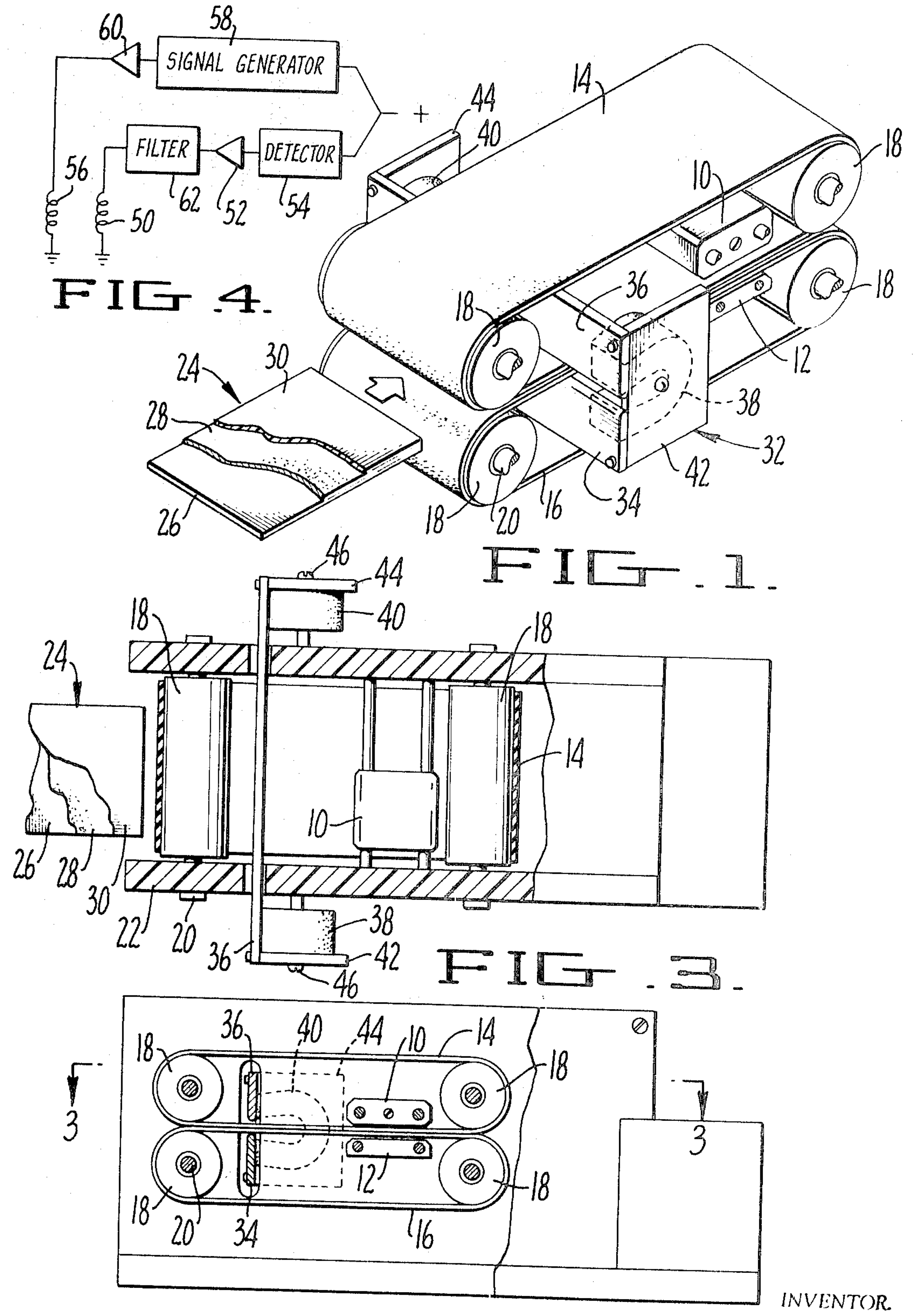
FIG. 1 is a perspective view of the interior mechanism of apparatus which may be used for recording and reading magnetic records in accordance with this invention.
FIG. 2 is a side elevational view of the apparatus of FIG. 1 mounted in a suitable housing with a portion of the housing broken away.
FIG. 3 is a sectional view through the apparatus of FIG. 2 taken on the plane indicated at 3—3 in FIG. 2.
FIG. 4 is a schematic circuit diagram showing a circuit which may be employed for performing the erasing steps of this invention in the magnetic reading head.

Referring now in detail to the drawings, the apparatus illustrated therein includes a magnetic recording head 10, and a pressure member 12 mounted on opposite sides of a magnetic recording member transport provided by belts 14 and 16 entrained over rollers 18. The rollers 18 are supported on suitable shafts 20 mounted in a frame 22 in conventional manner. The apparatus may be used as is well known in the art to convey a magnetic recording member 24 past the magnetic recording head 10 while the pressure member 12 keeps the head and recording member in close engagement. Electrical signals are supplied to or detected from the magnetic recording head 10 to record or reproduce information on the magnetic recording member 24.

In accordance with this invention, the magnetic recording member 24 is made from a generally rigid substrate 26 preferably in the form of the vinyl polymer plastic normally used for the manufacture of credit cards and the like, with the upper surface of the substrate 26 coated with a layer 28 of magnetically susceptible material, such as chromium dioxide mentioned above. The top surface of the magnetic recording layer 28 is preferably covered with a protective coating 30. The magnetic recording member 24 may be made by laminating together a sheet of plastic material which forms the substrate 26 and a sheet of magnetic recording tape which has the protective coating 30 as its substrate. Mounted adjacent to the transport belts 14 is an erasing means indicated generally at 32 which is made from a pair of magnetic pole pieces 34 and 36 on opposite sides of the path of the magnetic records 24.

A pair of permanent magnets 38 and 40 are mounted at opposite ends of the pole pieces 34 and 36 magnetically coupled thereto to provide a magnetic erasing field extending between the adjacent edges of the pole pieces 34 and 36. The strength of the erasing field can be controlled by properly balancing the strength of the permanent magnets 38 and 40, and the distance between the adjacent edges of the pole pieces 34 and 36. These parameters are properly selected to provide an erasing field between the pole pieces 34 and 36 which has a field strength above 450 oersteds and below the coercivity of the magnetic material which forms the magnetic recording layer 28 of the record number 24. As illustrated in FIGS. 1 and 3, the pole pieces and permanent magnets 34–40 may be mounted on the frame 22 of the device by suitable mounting plates 42 and 44 supported on the frame by screws 46.

It will be apparent that the apparatus of FIGS. 1–3 may be operated by driving the transport belts 14 and 16 to move the record number 24 in the direction of the arrow in FIG. 1 so that the record number passes first through the erasing means 32 and hence past the magnetic recording head 10. On the first pass through the apparatus, a drive signal may be applied to the recording head 10 to record information on the record member, as for instance where current account balance information may be recorded on a credit card used in place of a savings account passbook as mentioned in applicant's application Ser. No. 387,695 filed Aug. 5, 1964 now U.S. Pat. No. 3,513,298. After information is recorded on the record member 24 the record member may be removed from that apparatus for a prolonged period of time as when it may be carried away by the customer using the credit card, and at a later date the record member is returned to the position illustrated in FIG. 1 where the information recorded on the card may be read. During the reading operation, the record member 24 again passes first through the erasing means 32 and hence past the magnetic head 10, where the signal recorded on the recording member is detected. If, of course, a forged magnetic recording member 24 is passed through the apparatus during reading, where the recording member is made from a low-coercivity material, the detection head will not read any information from the recording member because the information will be erased prior to the completion of reading.

Referring to FIG. 4, it will be apparent that the erasing steps of this invention may be performed in the magnetic recording head itself, thus the magnetic recording head may contain a core member through which magnetic flux flows during recording and reading with an electrical coil surrounding the core to generate electrical voltage variation responsive to changes in the flux in coil, has illustrated in FIG. 4 where the detection coil 50 is connected through an amplifier 52 to a detector 54. When it is desirable to perform the erasing step of this invention in the magnetic recording head itself, a second coil 56 may be wound around the core in the magnetic head and connected to an electrical signal generator 58 through an amplifier 60 to create an erasing field intensity above 450 oersteds, but less than the coercivity of the material 28. The signal generator 58 may provide a direct current signal, in which case a filter 62 is preferably connected in the detection circuit as illustrated to filter from the detection circuit any signals having the frequency developed by signal generator 58.

While the invention has been described herein in relation to its use with magnetic credit cards, the invention may be used in other environments where magnetic recording is employed.

I claim:

1. The method of verifying the authenticity of magnetically recorded information which comprises:
   A. recording information at a recording signal field strength of at least 450 oersteds on a portable record member which comprises a carrier and a layer of magnetically susceptible material which has a coercivity above 450 oersteds and less than said field strength of said recording signal;
   B. Detecting said information in the form of remanent magnetic field adjacent to said record member after performing said recording step, and;
   C. Subjecting said record member to an erasing magnetic field of a strength above 450 oersteds and less than said coercivity of said material after performing said recording step and prior to the completion of the performance of said detecting step, wherein said recording step is performed at the location of a magnetic member recorder; said detecting and erasing steps are performed at the location of a magnetic member reader; and said record member is transported away from said recorder and said reader for a substantial period of time between the performance of said recording and detecting steps.

2. Apparatus for detecting a magnetic record recorded on a portable magnetic recording member made from a material having a coercivity above 450 oersteds which comprises:
   A. Detecting means for detecting a magnetic field adjacent thereto; said detecting means comprising a magnetic reading head and sensing means for detecting a magnetic field in said head;
   B. Erasing means for applying to materials adjacent thereto a substantially constant erasing magnetic field of a field strength greater than 450 oersteds but less than said coercivity during operation of said detecting means; said erasing means comprising means for passing said erasing field through said head while said sensing means is operating, and;
   C. Transport means for moving said erasing and detecting means and said magnetic recording member with respect to each other and adjacent to said erasing means before moving said magnetic recording member away from said detecting means.

3. Apparatus for detecting a magnetic record recorded on a portable magnetic recording member made from a material having a coercivity above 450 oersteds which comprises:
   A. Detecting means for detecting a magnetic field adjacent thereto; said detecting means comprising a magnetic reading head and sensing means for detecting a magnetic field in said head;
   B. Erasing means for applying to materials adjacent thereto an erasing magnetic field created by a permanent magnet of a field strength greater than 450 oersteds but less than said coercivity during operation of said detecting means and;
   C. Transport means for moving said erasing and detecting means and said magnetic recording member with respect to each other and adjacent to each other to move said magnetic recording member adjacent to said erasing means before moving said magnetic recording member away from said detecting means.

* * * * *